Nov. 20, 1962 W. J. BONNER 3,064,905
MANIFOLD FOR PRODUCING ENDLESS SHEET OF A GASEOUS MEDIUM
AT UNIFORM VOLUMETRIC FLOW RATE
Filed May 9, 1960

INVENTOR.
William J. Bonner
BY
Attorney.

United States Patent Office 3,064,905
Patented Nov. 20, 1962

3,064,905
MANIFOLD FOR PRODUCING ENDLESS SHEET OF A GASEOUS MEDIUM AT UNIFORM VOLUMETRIC FLOW RATE
William J. Bonner, Ashaway, R.I., assignor, by mesne assignments, to Crompton & Knowles Corporation, Worcester, Mass., a corporation of Massachusetts
Filed May 9, 1960, Ser. No. 27,613
5 Claims. (Cl. 239—590)

This invention relates generally to the extrusion of inflated plastic tubing, and more particularly to apparatus for setting the extruded tubing by chilling.

The present invention is concerned with the production of plastic tubing in accordance with a method like or similar to that disclosed in United States Patent No. 2,461,975. Briefly, plastic tubing is produced according to this method, by extruding through a ring-shaped die suitable thermoplastic as seamless tubing which emerges from the die in preferably vertical direction, and withdrawing the extruded tubing from the die in the same direction by a pair of squeeze rolls which are remote from the die and also serve to flatten the tubing between them into a ribbon which is wound as such onto a reel. The tubing is from its point of extrusion to the squeeze rolls held inflated by an entrapped gaseous medium introduced therein through the die. The quantity of the entrapped gaseous medium is selected so that the tubing, while still in a formative state, will be expanded to a desired diameter at which it will be set. To set the extruded tubing at the desired diameter, a cooling gaseous medium, usually atmospheric air, is blown against the exterior peripheral surface of the tubing in the vicinity of its extrusion from the die. On varying the rate of feed of the plastic through the die and/or the rate of withdrawal of the extruded tubing by the squeeze rolls, and varying the quantity of the entrapped gaseous medium in the tubing and/or the volumetric flow rate of the cooling air against the exterior of the tubing, the diameter and wall thickness of set tubing may be varied within wide limits and held within close tolerances at any selected diameter and wall thickness.

The uniformity of the wall thickness of set tubing depends primarily on a uniform feed of plastic of uniform temperature through the die throughout its ring-shaped aperture, and on a uniform volumetric flow rate of cooling air of uniform temperature against the tubing throughout its external peripheral surface and over the same level region thereof above the die. For directing cooling air against the external periphery of the extruded tubing, several air manifolds with inner ring-shaped discharge passages or nozzles have become known. While these prior manifolds are generally satisfactory for the production of many different tubes, the volumetric flow rate of air therefrom is not as uniform throughout their discharge passages as is desirable and is even imperative for the production of tubing with very close permissible tolerances in wall thickness, including very small wall thickness. Thus, even the production of tubing with only fairly close permissible tolerances in wall thickness becomes critical by virtue of the prevalent local variations in the volumetric air discharge rate from these prior manifolds. This holds true despite entirely concentric arrangement about the dies, and equal cross-sectional dimensions throughout, of the air paths through these prior manifolds at any stage thereof. Evidently, these structural characteristics of prior manifolds are inadequate to distribute to the discharge passages at the desired uniformity air that is admitted through intake ports which at the most are few in number and widely spaced for practical considerations. These structural characteristics of prior manifolds are further and particularly inadequate to achieve throughout their discharge passages uniform volumetric air flow at all prevalent rates commensurate with the production of tubing of widely varying diameters and wall thicknesses on the one hand, and with preserving the continuity of the still formative and, hence, fragile tubing under the impact of the cooling air on the other hand.

It is the primary object of the present invention to provide an air manifold of this type in which the volumetric flow of air at all prevalent rates through its ring-shaped discharge passage is throughout the latter considerably more uniform than through the discharge passages of prior manifolds of this type, and is of nearly absolute uniformity, despite only a few widely spaced intake ports in the manifold. With this manifold, the production of tubing with fairly close permissible tolerances in wall thickness is no longer critical, and the production of tubing with very close tolerances in wall thickness, including very small wall thickness, becomes possible in the first place and is entirely practical and in no wise critical in the second place.

It is another object of the present invention to provide an air manifold of this type in which the air path therethrough is designed to force air in and throughout an intermediate zone thereof into such turbulence which will distribute the onrushing air from a few widely spaced intake ports uniformly to and throughout the discharge passage, yet is sufficiently mild in intensity not to impede the air flow through the path so unduly that the air may absorb heat from the manifold regardless of whatever the latter's elevated temperature by virtue of its proximity to the extrusion die may be.

It is a further object of the present invention to provide an air manifold of this type in which the air path therethrough is so designed that the intensity of the aforementioned air turbulence in an intermediate zone thereof varies locally substantially proportionately with the velocity thereat of the onrushing air, and the turbulent air impedes direct air flow to the discharge passage substantially proportionately with the intensity of its turbulence, so that the sole and automatic response of the manifold to any and all velocities of the air therein flowing to the turbulence zone is distribution of the air to the discharge passage at a substantially uniform rate throughout the latter.

Other objects and advantages will appear to those skilled in the art from the following, considered in conjunction with the accompanying drawings.

In the accompanying drawings, in which certain modes of carrying out the present invention are shown for illustrative purposes:

Figure 2:
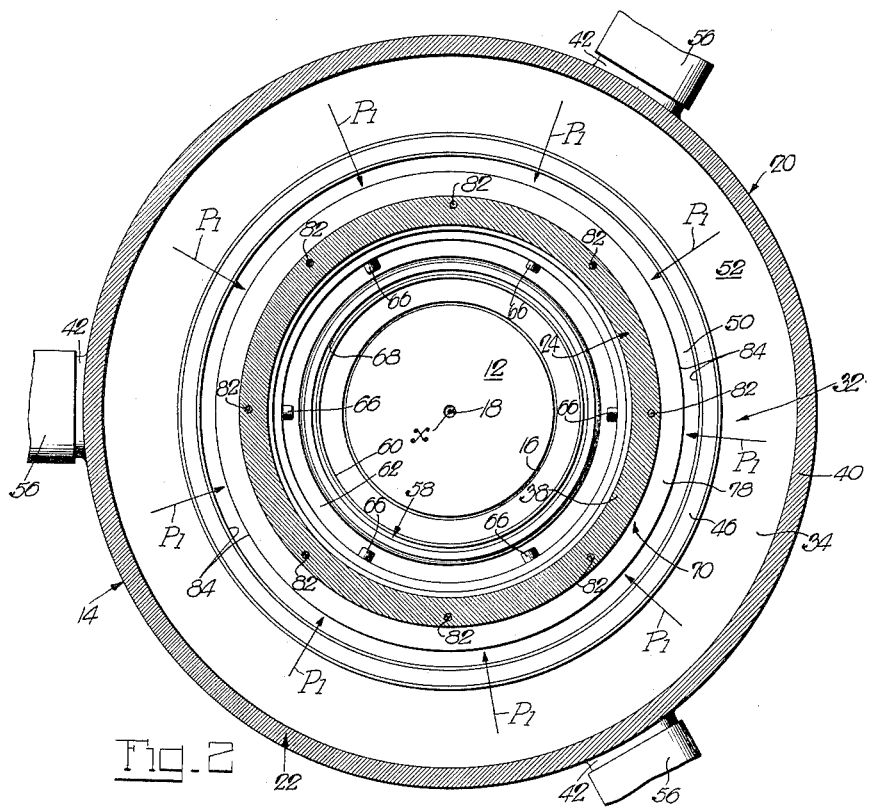
FIG. 2 is another section through the same manifold taken on the line 2—2 of FIG. 1.
Figure 1:
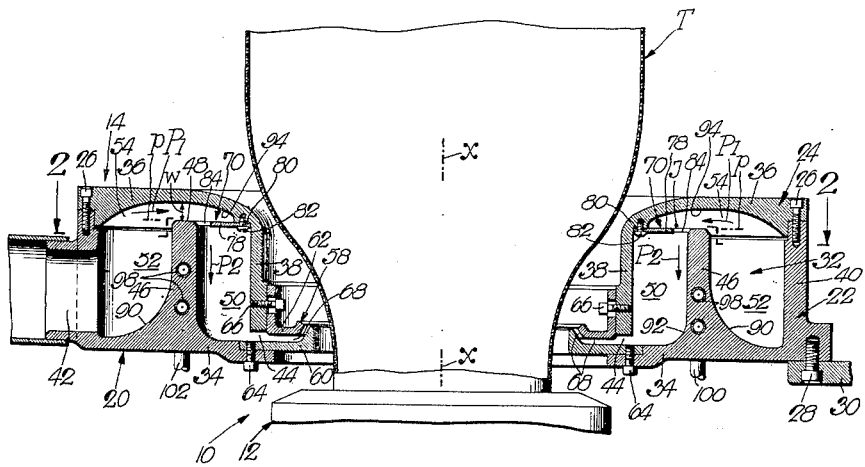
FIG. 1 is a section through a manifold embodying the present invention.

Referring to the drawing, there is shown in FIG. 1 part of an exemplary installation 10 for producing plastic tubing according to the aforementioned method. The present installation comprises an extrusion die 12, a manifold 14, and a pair of power-driven squeeze rolls (not shown) which continuously withdraw extruded tubing T from the die and flatten the same at their bite. The die 12 has an endless, presently annular, aperture 16 (FIG. 2) through which to extrude a suitable thermoplastic in tubular form. Air under suitable superatmospheric pressure may be admitted into the extruded tubing through one or more ports 18 in the die 12. The compressed air thus admitted into the tubing T holds the latter inflated at a desired diameter at which it becomes set. In the present example, the tubing T is by the contained air expanded to a diameter larger than that at its point of extrusion, the expansion of the tubing taking place while the plastic thereof is still in a formative state. The expansion zone of the tubing may in well known manner be varied to suit.

The manifold 14 functions to discharge an even stream or sheet of a suitable cooling gaseous medium, presently atmospheric air, against the outer periphery of the extruded tubing while it is still in a formative state. The cooling air thus impinging on the tubing chills the same and, hence, expedites and in large measure controls the setting of the tubing at a desired diameter. Also, the manifold 14, in its proximate location with respect to the die 12 and by virtue of its control over the setting of the tube, takes a part in determining the expansion zone of the tubing. The uniformity of the cross-sectional shape, presently annular, of the set tubing, as well as the uniformity of the wall thickness of the same throughout, depend on the uniformity of the velocity and temperature of the cooling air stream from the manifold at and throughout its impingement on the tubing and also on its impingement on the tubing within a zone thereof which is evenly spaced all around from the die 12, as will be readily understood. Also, it will be appreciated that the air stream impinges on the tubing while it is still in a formative and, hence, fragile state, wherefore the velocity of the air stream must necessarily be relatively low in order to preserve the continuity of the tubing. However, in order that the air stream may expeditiously chill the tubing and retain effective control over its setting within a relatively short longitudinal "freeze" zone thereof, the volumetric flow rate of the cooling air must necessarily be rather large.

The manifold 14, which is designed to meet the aforementioned requirements and characteristics of the cooling air stream, comprises a casing 20 which is presently formed of two complemental sections 22 and 24 secured to each other by screws 26, with the casing section 22 being presently bolted at 28 to any suitable support 30. The casing 20, which is presently ring-shaped about a center axis $x$ that coincides with the die axis in the exemplary installation of FIG. 1, provides an annular chamber 32 of presently uniform cross-section which is concentric with the axis $x$ and formed by bottom, top, and inner and outer peripheral walls 34, 36, 38 and 40 of the casing. Leading to and from the chamber 32 are admission and discharge means, presently a plurality of equiangularly spaced inlet ports 42 in the outer peripheral casing wall 40 and an annular discharge orifice 44 in the inner peripheral casing wall 38. Provided in the casing 20 is a partition wall 46 which divides the chamber 32 into several compartments. The partition wall 46, which is disposed concentrically with respect to the axis $x$ and presently extends in the direction of the latter to its termination at 48 in a plane $p$ perpendicular to the axis $x$ and spaced from the adjacent top end of the chamber 32, divides the latter into inner and outer compartments 50 and 52 and a connecting end compartment 54 of which each compartment is concentric with the axis $x$ and of uniform cross-section throughout. The inner and outer compartments 50 and 52 are presently also of greater axial extent and have larger individual volumes than the end compartment 54. The inlet ports 42 are through conduits 56 and a common valve (not shown) connected with a suitable source of compressed air of preferably atmospheric temperature. The discharge orifice 44, which presently leads from the bottom end of the inner compartment 50, is of uniform width throughout its annular extent, and is presently continued into closer proximity to the tubing T, and hence to the center axis $x$, by an annular discharge nozzle 58. The discharge nozzle 58 is presently formed by separate ring-like members 60 and 62 which are mounted at 64 and 66 on the casing walls 34 and 38, respectively, in spaced relation with each other to define an annular discharge passage 68 of uniform width throughout and pointing generally at the axis $x$. The nozzle member 62 is presently adjustable on the casing wall 38 for adjustment of the width of the discharge passage 68. The inner end of the discharge passage 68 is presently also inclined to the axis $x$ so as to direct the cooling air in a general upward stream against the tubing T.

With compressed air being admitted into the manifold through the few widely spaced inlet ports 42, and with the inner and outer compartments 50, 52 and even the end compartment 54 having adequate volumes to permit air flow therethrough at preferably relatively large volumetric rates and relatively low velocities, it stands to reason that a predominant part of the constantly admitted air would encounter relatively little obstruction in its flow in the manifold in the most direct path to the discharge orifice 44. As a result, air would be discharged from the nozzle 58 at a volumetric flow rate which throughout the annular extent of the discharge passage 68 would vary quite considerably, and in any event far more than would be permissible for the aforementioned purpose of expediting and controlling the setting of the extruded tubing T. In order to achieve discharge of air from the nozzle 58 at a substantially uniform volumetric flow rate throughout, the manifold 14 features an air flow control which is automatic in its action and relies for its performance on turbulence of the air on its passage through the manifold. This flow control is in its structural form a turbulence pocket 70 which for the performance of its designated control function is arranged in the first place in entrapping relation with the forced air passing through the manifold. Moreover, in order that the pocket 70 may essentially perform its flow control function, the same is related with the adjacent end and inner compartments 54 and 50 in the following general manner. Thus, the outer compartment 52 and continuing end compartment 54 on the one hand and the inner compartment 50 on the other hand define in the chamber 32 cross-sectionally thereof successive first and second flow paths P1 and P2 from the air admission means to the discharge orifice in successive first and second transverse directions, respectively, presently generally radially inwardly and axially downwardly, with the junction of these flow paths being at J (FIG. 1), and the pocket 70 is open to and in flow alignment with the path through the end compartment 54 and forms an extension of the latter in the presently radial inward direction of its flow path P1 beyond its junction J with the flow path P2 through the inner compartment 50, with the space in the pocket being uniform and uninterrupted circumferentially throughout this pocket. With the pocket 70 thus generally related with the adjacent flow paths through the manifold, the pocket will act, by entrapment and ensuing turbulence of the admitted air under pressure, to dispense the air to the last flow path, presently through the inner compartment 50, at a volumetric flow rate which is substantially uniform throughout the annular extent of the latter.

In the present example, the pocket 70 is formed in the end compartment 54 by an annular baffle 78 which is secured to an annular shoulder 80 in the chamber 32 by screws 82. The baffle 78, which extends within the annular confines of the inner compartment 50 and is substantially co-extensive with the plane $p$, is uniformly spaced from the partition 46 to form therewith the sole, and presently widthwise restricted, passage 84 between the inner and end compartments 50 and 54. The pocket 70 thus formed in the end compartment 54 by the baffle 78 is of uninterrupted uniform cross-sectional width and shape throughout.

In operation of the manifold 14, air under pressure is constantly admitted to the same through the inlet ports 42, with its predominant flow in the outer compartment 52 being directly to the end compartment 54 and then through the latter generally radially toward and into the pocket 70, and with its less predominant flow in these compartments being scattered, with resulting uneven distribution of the air in the end compartment 54 as well as to the pocket 70. The air thus reaching the open end of the pocket 70 has neither a uniform volumetric flow rate nor a uniform radial flow direction throughout, but is forced into entrapment in the pocket and thus rendered turbulent therein, with the turbulence of the air extending back over the passage 84. While it was recognized that the continuous turbulence of the air over and at the passage 84 will act as a barrier to free air flow through the latter and into the inner compartment 50, and will locally release or dispense air into the latter at rates varying with the turbulence of the air thereat, it was a distinct surprise when it was found that the volumetric flow rate of the dispensed air into the inner compartment 50 is most uniform throughout the annular extent of the latter. There is no ready explanation for this remarkable automatic flow control performance of the pocket 70 and of the ensuing air turbulence therein and thereat, and it can only be theorized that the air turbulence of varying intensity around the pocket distributes the turbulent air in some more even measure around the passage 84, and the turbulent air at each cross-section of the latter impedes direct air flow therethrough to an extent which has some proportional relation with the intensity of its turbulence.

The described flow-control performance of the manifold persists with the same accuracy within relatively wide limits of the volumetric flow rate of the air admitted into the manifold. Also, while the depth of the pocket 70 in relation to the width of the passage 84 must necessarily be such that the ensuing turbulence of the air extends and is fully effective over this passage, the dimensional relation of their respective depth and width may vary relatively widely. Further, while it has been mentioned hereinbefore that the end compartment 54 has a volume to permit air flow therethrough at relatively large volumetric rates and relatively low velocities, it is obvious that its width w, while of considerable permissible variation, must provide for adequate air velocity toward and into the pocket 70 for the requisite air turbulence therein and over the passage 84. Also, since the flow of the air at a uniform volumetric rate in and throughout the annular extent of the manifold originates at the passage 84, the inner compartment 50, while presently serving as an exhaust chamber for the air due to its relatively large volume, need not be an exhaust chamber and may be of any smaller volume as long as it does not cause disturbing back pressure of the air at the passage 84. Conversely, the width of the discharge orifice 44 and of the discharge passage 68 in the nozzle 58 may vary widely to obtain annular sheets of different thickness of air or any other gaseous medium at uniform volumetric flow rates throughout for applications other than the present one. Also, and as a matter of good design, the somewhat tortuous flow path through the manifold is fairly smooth, except at the featured turbulence or interference pocket 70. To this end, the partition 46 is smoothly curved throughout as at 90 and 92, and the top wall 36 is dome-shaped as at 94 and, hence, also fashions the pocket 70 into general wedge shape cross-sectionally thereof. The present manifold of the exemplary use in the production of extruded thermoplastic tubing is, by virtue of its proximity to the extrusion die, subjected to heat from the latter. It has been found, however, that the temperature of the discharge air from the manifold is not only uniform throughout but has not been noticeably raised above its temperature at admission thereinto. Nevertheless, the manifold may, if desired, be provided with a cooling jacket which in the present instance is a cast-in cooling coil 98 in the partition wall 46 for circulation of any suitable cooling medium by way of an inlet 100 thereto and an outlet 102 therefrom.

Given by way of example only, following is a description of an actual performance of a manifold of the present invention. The manifold used was in every respect like the one shown in the drawing, except that all its dimensions were exactly four times larger. Air under pressure from a common source was admitted into the manifold, and the discharge velocity of the air from the nozzle 58 at numerous points circumferentially thereof was measured with commercial air meters. Thus, it was found that at a certain admission velocity of the air (not measured) into the manifold, the discharge velocity of the air at eight different and randomly selected places around the nozzle was, in feet per minute, 5500, 5600, 5600, 5400, 5500, 5400, 5400, and 5400, and was at eight other and randomly selected places around the nozzle 5500, 5700, 5500, 5500, 5500, 5400, 5400 and 5500, and was at still other and randomly selected places around the nozzle 5500, 5700, 5700, 5400, 5500, 5450, 5400 and 5500. These figures indicate the truly remarkable degree of uniformity of the discharge velocities of the air throughout which may be attained with the manifold. Insofar as the wide range of the discharge velocities of the air at uniform volumetric flow rates from this particular manifold is concerned, readings to-date of these air discharge velocities at many randomly selected places around the nozzle indicated the same remarkable uniformity of these velocities at a lower limit of approximately 2300 feet per minute and at an upper limit of 9000 feet per minute, with the true upper limit being as yet undetermined due to incapacity of the air meters used to indicate air velocities over 9000 feet per minute.

While in the present exemplary manifold the flow path therethrough is from the outside to the inside, it is, of course, fully within the purview of the present invention to arrange the flow path therethrough in any other direction, such as from the inside to the outside or from the bottom to the top, for example. Further, while the present exemplary manifold and the sheet of air therefrom are annular, it is also fully within the purview of the present invention to arrange the manifold for the production of an endless sheet of air or any other gaseous medium which is other than annular. Thus, it is fully within the teaching of the present invention to arrange the manifold and the compartments, pocket and discharge orifice therein, in oval shape, for example, so as to produce an oval sheet of a gaseous medium at a uniform volumetric flow rate throughout.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A manifold for producing a sheet of a gaseous medium, comprising a casing with an axis having an endless chamber about said axis with admission means and an endless discharge orifice, said chamber being of substantially uniform cross-section throughout and defining cross-sectionally thereof a longitudinal passage providing successive first and second flow paths in successive first and second transverse directions, respectively, from said admission means to said discharge orifice, said chamber further having uninterrupted endless complemental surfaces together defining the wall of an endless pocket about said axis of uniform cross-section circumferentially throughout, with said pocket being circumferentially throughout open to and continuous with said first path and constituting an extension of said first path in said first direction beyond its junction with said second path, and the space in said pocket being uniform and uninterrupted circumferentially throughout said pocket, so that said pocket will act, by entrapment and ensuing turbulence of an admitted gaseous medium under pressure in and throughout said space, to dispense the medium to said second path at a substantially uniform volumetric flow rate throughout the endless extent of said second path.

2. A manifold for producing an endless sheet of a gaseous medium, comprising a casing with a center axis having an endless chamber about said axis, an axial partition in said chamber having an end coextensive with a plane perpendicular to said axis and spaced from the adjacent end of said chamber to divide the latter into first inner and outer compartments and a connecting end compartment of which at least said end compartment and one of said first compartments are individually of uniform cross-section throughout, and an endless discharge orifice and admission means leading from and to said one and the other of said first compartments, respectively; and an endless baffle in said chamber between said one compartment and end compartment and substantially coextensive with said plane and uniformly spaced from said partition to form therewith the sole passage between said one compartment and end compartment, the surface of said baffle facing the interior of said end compartment being uninterrupted and spaced throughout from the confronting wall of said end compartment and defining in said end compartment an endless pocket of uninterrupted uniform cross-sectional width and shape throughout, with said pocket being throughout its uniform cross-sectional width and shape in uninterrupted communication and continuous with the remainder of said end compartment, so that said pocket will act, by entrapment and ensuing turbulence of an admitted gaseous medium under pressure, to dispense the medium through said passage to said one compartment at a substantially uniform volumetric flow rate throughout the endless extent of said one compartment.

3. A manifold for producing an annular sheet of a gaseous medium, comprising a casing with a center axis having a ring-shaped chamber about said axis, an axial partition in said chamber having an end coextensive with a plane perpendicular to said axis and spaced from the adjacent end of said chamber to divide the latter into inner and outer compartments and a connecting end compartment of which at least said end and inner compartments are individually of uniform cross-section throughout and concentric with said axis, and admission means and an annular discharge orifice leading to and from said outer and inner compartments, respectively; and a ring-shaped baffle in said chamber between said end and inner compartments and substantially coextensive with said plane and uniformly spaced from said partition to form therewith the sole passage between said end and inner compartments, the surface of said baffle facing the interior of said end compartment being plane and spaced throughout from the confronting wall of said end compartment and defining in said end compartment a ring-like pocket of uninterrupted uniform cross-sectional width and shape throughout, with said pocket being throughout its uniform cross-sectional width and shape in interrupted communication and continuous with the remainder of said end compartment, so that said pocket will act, by entrapment and ensuing turbulence of an admitted gaseous medium under pressure, to dispense the medium through said passage to said inner compartment at a substantially uniform volumetric flow rate throughout the circular extent of said inner compartment.

4. A manifold as set forth in claim 3, in which said admission means are spaced ports in said casing.

5. A manifold as set forth in claim 3, in which said baffle surface is of larger width than said passage.

References Cited in the file of this patent

UNITED STATES PATENTS

| 2,632,206 | Pierce | Mar. 24, 1953 |
| 2,770,009 | Rogal et al. | Nov. 13, 1956 |
| 2,926,384 | Hertz et al. | Mar. 1, 1960 |

FOREIGN PATENTS

| 571,392 | Canada | Feb. 24, 1959 |